US010255927B2

(12) United States Patent
Huttunen et al.

(10) Patent No.: US 10,255,927 B2
(45) Date of Patent: Apr. 9, 2019

(54) USE CASE DEPENDENT AUDIO PROCESSING

(71) Applicant: Microsoft Technology Licensing, LLC, Redmond, WA (US)

(72) Inventors: Anu Huttunen, Tampere (FI); Mari Partio, Pirkkala (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/663,299

(22) Filed: Mar. 19, 2015

(65) Prior Publication Data
US 2016/0275962 A1 Sep. 22, 2016

(51) Int. Cl.
*G10L 21/0208* (2013.01)
*G10L 21/0216* (2013.01)
(Continued)

(52) U.S. Cl.
CPC ........ *G10L 21/0208* (2013.01); *G10K 11/178* (2013.01); *G10L 21/0216* (2013.01); *H04M 1/6025* (2013.01); *H04R 1/406* (2013.01); *H04R 3/005* (2013.01); *H04W 4/026* (2013.01); *H04W 4/70* (2018.02); *G10K 2210/108* (2013.01); *G10K 2210/504* (2013.01); *G10L 2021/02087* (2013.01); *G10L 2021/02165* (2013.01);
(Continued)

(58) Field of Classification Search
CPC ............. G10L 21/0208; G10L 21/0216; G10L 2021/02087; G10L 2021/02165; G10L 2021/02166; G10K 11/178; G10K 2210/108; G10K 2210/504; H04W 4/005; H04W 4/026; H04M 1/6025; H04R 1/406; H04R 3/005; H04R 2410/01; H04R 2410/03; H04R 2499/11
USPC ................................................ 381/71.1, 71.6
See application file for complete search history.

(56) References Cited

U.S. PATENT DOCUMENTS 7,565,288 B2 7/2009 Acero et al.
8,041,054 B2 10/2011 Yeldener et al.
(Continued)

FOREIGN PATENT DOCUMENTS

WO 2011063830 A1 6/2011
WO 2014063755 A1 5/2014

OTHER PUBLICATIONS

Hennecke, et al., "Towards Acoustic Self-Localization of Ad Hoc Smartphone Arrays", In Proceedings of Third Joint Workshop on Hands-free Speech Communication and Microphone Arrays, May 30, 2011, 6 pages.
(Continued)

*Primary Examiner* — William A Jerez Lora

(57) ABSTRACT

An audio processing scheme is described. In an example, an apparatus comprises: at least two acoustic sensors through which audio content is received; at least one other sensor; an audio processor connected to the sensors and configured to receive audio information from the acoustic sensors and other information from the other sensor. The audio processor is configured to determine a use case of the apparatus based on the audio information and the other information. The audio processor is configured to adjust at least one audio processing scheme for the apparatus based on the determined use case. In other examples, a method and a computer program product are described.

20 Claims, 6 Drawing Sheets

(51) Int. Cl.
    *G10K 11/178* (2006.01)
    *H04M 1/60* (2006.01)
    *H04R 1/40* (2006.01)
    *H04R 3/00* (2006.01)
    *H04W 4/02* (2018.01)
    *H04W 4/70* (2018.01)

(52) U.S. Cl.
    CPC .................. *G10L 2021/02166* (2013.01);
        *H04R 2410/01* (2013.01); *H04R 2410/03*
        (2013.01); *H04R 2499/11* (2013.01)

(56) References Cited

U.S. PATENT DOCUMENTS

| | | | |
|---|---|---|---|
| 8,594,350 B2 | 11/2013 | Hooley et al. | |
| 8,611,556 B2 | 12/2013 | Makinen et al. | |
| 8,755,536 B2 | 6/2014 | Chen et al. | |
| 9,007,871 B2* | 4/2015 | Armstrong-Muntner | .................... G01S 15/003 367/118 |
| 2003/0161485 A1 | 8/2003 | Smith | |
| 2004/0013038 A1 | 1/2004 | Kajala et al. | |
| 2005/0195988 A1 | 9/2005 | Tashev et al. | |
| 2005/0201204 A1 | 9/2005 | Dedieu et al. | |
| 2005/0201549 A1 | 9/2005 | Dedieu et al. | |
| 2008/0267422 A1 | 10/2008 | Cox | |
| 2011/0222701 A1 | 9/2011 | Donaldson et al. | |
| 2012/0263019 A1* | 10/2012 | Armstong-Muntner | .................... G01S 15/003 367/118 |
| 2012/0327115 A1 | 12/2012 | Chhetri et al. | |
| 2013/0121498 A1 | 5/2013 | Giesbrecht | |
| 2013/0332156 A1* | 12/2013 | Tackin | ................. H04M 1/6041 704/226 |
| 2014/0128032 A1 | 5/2014 | Muthukumar | |
| 2014/0270202 A1 | 9/2014 | Ivanov et al. | |
| 2014/0270217 A1* | 9/2014 | Ivanov | ................. H04R 29/005 381/66 |
| 2014/0274218 A1* | 9/2014 | Kadiwala | ............ H04M 1/6041 455/570 |
| 2016/0051167 A1* | 2/2016 | Saha | .................... A61B 5/1123 702/141 |

OTHER PUBLICATIONS

Markus, et al., "Measurement-Based Modal Beamforming Using Planar Circular Microphone Arrays", In Proceedings the EAA Joint Symposium on Auralization and Ambisonics, Apr. 3, 2014, 6 pages.

Tashev, et al., "A New Beamformer Design Algorithm for Microphone Arrays", In Proceedings of IEEE international Conference on Acoustics, Speech, and Signal Processing, vol. 3, Mar. 18, 2005, 4 pages.

Kajala, et al., "Broadband beamforming optimization for speech enhancement in noisy environments", In Proceedings of IEEE Workshop on Applications of Signal Processing to Audio and Acoustics, Oct. 17, 1999, 4 pages.

"International Search Report and Written Opinion Issued in PCT Application No. PCT/US2016/017051", dated May 3, 2016, 10 Pages.

"International Preliminary Report on Patentability Issued in PCT Application No. PCT/US2016/017051", dated Jun. 13, 2017, 6 Pages.

"Second Written Opinion Issued in PCT Application No. PCT/US2016/017051", dated Feb. 28, 2017, 5 Pages.

* cited by examiner

USE CASE DEPENDENT AUDIO PROCESSING

BACKGROUND

Many mobile devices, including smartphones and tablet computers, have several audio sensors such as microphones. An audio processing takes place in the mobile device, for example during a call or when using voice recognition in the hands-free mode. In a mobile device with multiple microphones, it is possible to use audio processing to improve audio quality, for example to reduce the amount of ambient noise, which is picked up by the microphones. Audio processing can significantly improve the audio quality and/or a voice or speech recognition rate of the mobile device.

Also, in a mobile device there are usually several sensors, other than audio sensors. Examples of these may be an accelerometer, a gyroscope, a magnetometer, etc. These other sensors output information to the mobile device, which is typically used to determine an orientation of the mobile device, a motion of the mobile device, etc.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

An audio processing scheme is described. In an example, an apparatus comprises: at least two acoustic sensors through which audio content is received; at least one other sensor; and an audio processor connected to the sensors and configured to receive audio information from the acoustic sensors and other information from the other sensor. The audio processor is configured to determine a use case of the apparatus based on the audio information and the other information. The audio processor is configured to adjust at least one audio processing scheme for the received audio content based on the determined use case.

In other examples, a method and a computer program product are discussed along with the features of the apparatus.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples may be described and illustrated herein as being implemented in a smartphone or a mobile phone, these are only examples of a mobile devices and not a limitation. As those skilled in the art will appreciate, the present examples are suitable for application in a variety of different types of mobile devices, for example, in tablets, phablets, portable computers, lap tops, cameras, etc.

Figure 1:
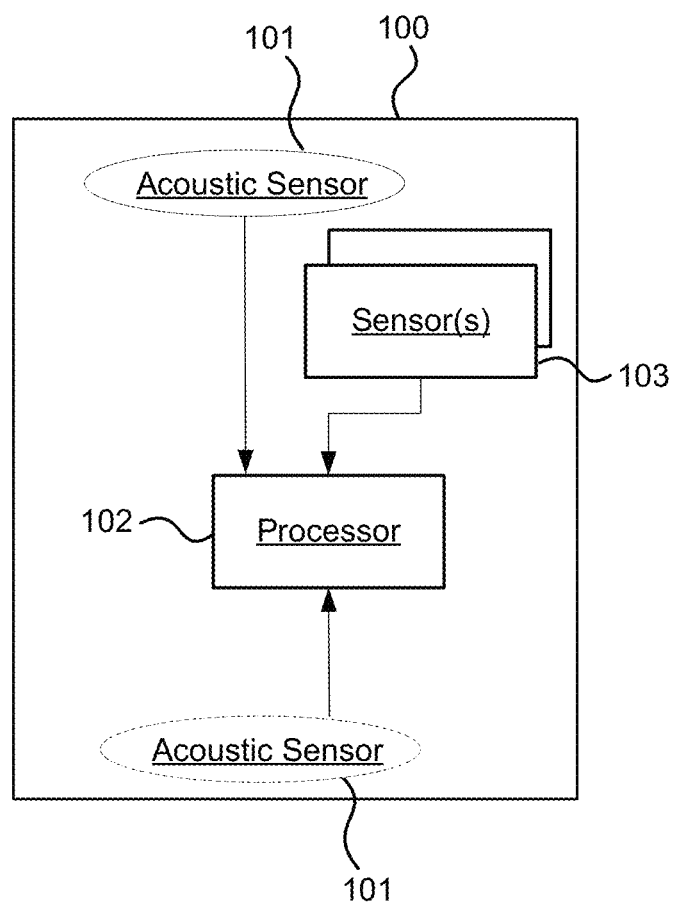
FIG. 1 illustrates a schematic representation of a mobile device in accordance with an illustrative example.

According to an example, a mobile device 100 is shown in FIG. 1. The mobile device 100 is configured to change an audio processing scheme in the device 100 depending on a use case. The use case may describe one or more ways in which the device 100 is being or will be used or the current status of the device 100. The use case may include an activity class of the mobile device 100. The activity class may describe a current activity or movement of the user of the device 100 such as walking, running, riding a bicycle, or being still etc. with the exception of the idle class when the device is not with the user but placed for example on a surface. The use case may be based on, in addition to the activity class, characteristics of surroundings of the device 100 and a physical situation of the device 100. The use case may be based on other sensor data. The use case may also be based on audio sensor data. The use case may further optionally include an orientation of the mobile device 100. The use case may further optionally include information on a surface, on which the mobile device 100 is located. The use case is deduced from sensor data, for example accelerometer, gyroscope, or magnetometer data, to name a few, in combination with information, which can be deduced from the received audio signals. Consequently, in addition to the sensor information, the information obtained from the received audio signals gives more versatile and accurate determination of the use case of the mobile device 100. For example, the mobile device 100 can determine from the sensor data an activity class that the mobile device 100 is in an idle mode, meaning that it is placed on a surface. Also information about an orientation of the mobile device 100, for example whether the mobile device 100 is facing up or down, may be further deduced from the sensor data. Furthermore, information of the quality of the surface, for example hardness or softness, may then be deduced from audio data or other sensor data, or a combination of these. All of this information is used to determine the use case and accordingly adjust an audio processing scheme of the mobile device 100. It should be noted that alternatively the use case may also be referred to as a use scenario that may be used interchangeably.

Each use case has corresponding audio processing parameters, which are selected based on the determined use case. For example, the audio directivity processing is changed, in order to obtain more optimal noise reduction in the audio signal. According to examples, beamforming parameters, adaptive interference cancellers, and microphone calibration schemes may be parts of the directivity processing that might be affected, depending on the determined use case.

Referring to FIG. 1, the mobile device 100 includes two acoustic sensors 101, an audio processor 102, and one or more other sensors 103. One of the acoustic sensors 101 is illustrated by a dashed line in order to demonstrate that it may be located on a back side of the mobile device 100. In the example shown in FIG. 1, the device 100 is a smartphone and the acoustic sensors 101 are microphones. However, it is understood that numerous types of handheld and/or mobile devices 100, including smartphones, tablets, etc., other types of acoustic sensors 101 may be implemented, and the other sensor 103 may be any combination of accelerometers, gyroscopes, compasses, position sensors, etc. It is further contemplated that various embodiments of the mobile device 100 may incorporate a greater number of acoustic sensors 101 and/or various types and numbers of other sensors 103.

Audio content, which is received by the acoustic sensors 101, is provided to the audio processor 102. The audio processor 102 further receives data input from the other sensor 103, and uses data to control the audio processing schemes or algorithms applied to received audio content, as described further herein in examples. The audio processor 102 may be any type of audio processor, including a sound card and/or audio processing units in typical mobile devices. An example of an appropriate audio processor 102 is a general purpose CPU such as those typically found in handheld devices, smartphones, etc. Alternatively, the audio processor 102 may be a dedicated audio processing device.

There are various examples of the other sensor 103 shown in FIG. 1, which may be used in the device 100. For example, a magnetometer that measures magnetization/magnetic fields, a light sensor that measures the strength of light, a gyroscope that measures orientation, a hygrometer that measures moisture in the atmosphere, a thermometer that measures ambient temperature, a barometer that measures atmospheric pressure, a proximeter that detects when something is close, an accelerometer that measures acceleration, etc. Further, the output of multiple types of other sensors 103 may be used in combination as input to the audio processor 102. For example, the combination of an accelerometer and a magnetometer sensor may be used to supply the audio processor 102 with various forms of non-audio data. The other sensor 103 is configured to output to the audio processor 102 non-audio information relating to the mobile device 100.

An example may improve the audio quality in a mobile device 100 by further utilizing data from other sensor 103 in audio processing for received audio data. From data received from both audio sensors and other sensors 101,103, it is possible to deduce various use cases of the mobile device 100. For example, it is possible to deduce if the mobile device 100 is placed on a surface or if it is held in the user's hand. Also, it is possible to know if the mobile device 100 is facing up or down while placed on a surface. It is further possible to detect if the device 100 is facing towards the user or the opposite direction in the user's hand. This information is used in audio processing, for example in a directivity processing, for improving the audio quality, which may be significantly improved especially in a noisy environment. The mobile device 100 may be able to configure more optimal audio processing scheme based on a comprehension on the use case and characteristics of surroundings of the device 100. Noise in the audio processing may be reduced, and better focus on the user's interaction with the device 100 may be achieved.

In the example shown in FIG. 1, the mobile device 100 is configured to use more optimal audio processing depending on a determined use case of the mobile device 100. The audio processor 102 is configured to deduce the use case from the received data. The use case may be determined based on an activity class of the mobile device 100, optionally based an orientation of the mobile device 100, and optionally based on a surface material. The data is received from the other sensor 103 and from the audio sensor 101, for example, orientation information and the audio signal itself.

The audio processor 102 is configured to determine an activity class. The use case of the mobile device 100 is based on the activity class. The activity class defines an approximation of a current activity or movement of the user of the mobile device 100. The activity class is based on various sensor data information. The activity classes may be predetermined, for example there are a number of different predetermined activity classes of the user of the mobile device 100. Furthermore, the activity classes may be determined dynamically. A specific application of the mobile device 100 may provide the audio processor 102 with predefined activity categories of the mobile device 100. The activity class recognition aims to automatically determine a closest activity class to the current activity of the mobile device 100 based on a series of observations received from the sensors 101, 103. The activity class may be developed based on various information and the relationships between the information.

According to an example, the audio processor 102 receives the activity class information as input. For example, a specific application of the device 100 may be configured to acquire the activity class information and feed it to the audio processor 102.

For example, use cases for hands-free audio processing of the mobile device 100 may be as follows:

Mobile device 100 in an idle mode, on a hard surface, facing up.

Mobile device 100 in an idle mode, on a hard surface, facing down.

Mobile device 100 in an idle mode, on a soft surface, facing up.

Mobile device 100 in an idle mode, on a soft surface, facing down.

Mobile device 100 not in an idle mode, on user's hand, facing the user. When the mobile device 100 is held in user's hand, it is not in idle mode.

Mobile device 100 not in an idle mode, on user's hand, facing to the opposite direction. When the mobile device 100 is held in user's hand, it is not in idle mode.

Mobile device 100 not in an idle mode, not in user's hand. For example held in a bike basket while biking, held in pocket or in handbag while walking.

The above illustrate a few examples and various different use cases. For example, there might be a different set of hand-portable use cases, than those described above, for a mobile device 100. Or there might be a set of specific use cases for the voice recognition front-end, etc.

A certain audio processing setting is designed for each use case. Audio processing setting may be interchangeably referred to as audio processing scheme. Audio parameters can be determined and optimized to each use scenario. Storage of the mobile device 100 may contain a set of audio parameters. The most suitable audio processing setting can be selected to correspond with the determined use case. The audio processing settings include various aspects for audio processing. For example, directivity, beamforming, AIC, calibration scheme are controlled. According to an example, a different directivity can be designed for all or some multi-microphone use cases. When the use case is obtained with the help of other sensor data, the audio processing can be changed to the appropriate mode and settings. It is also possible to change other audio processing parameters apart from the directivity parameters depending on the use case. Beamforming and directivity are merely examples of various audio processing parameters to be selected.

Figure 2:
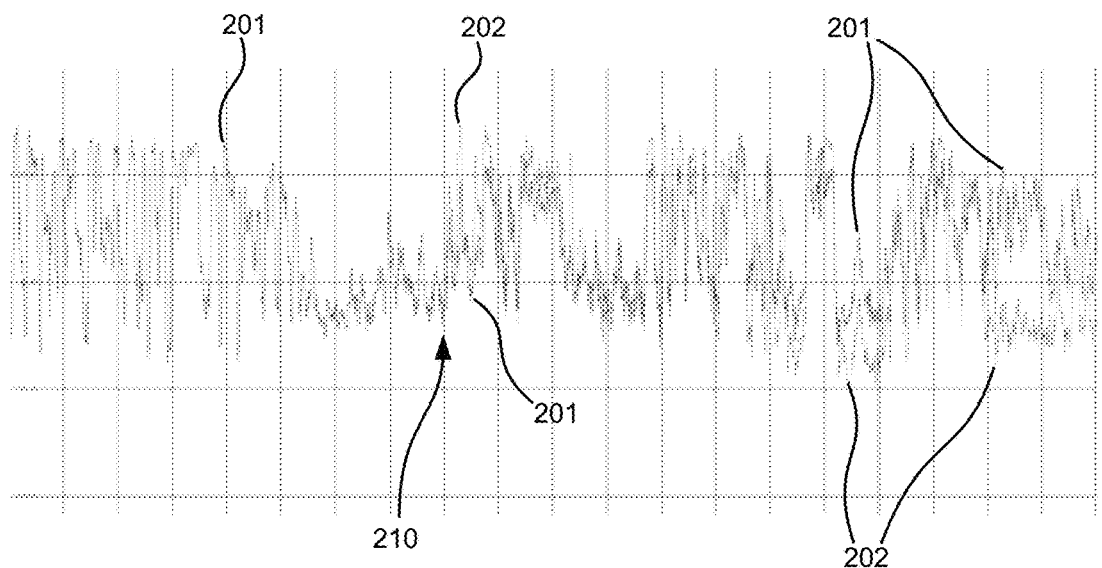
FIG. 2 illustrates an audio signal in accordance with an illustrative example.

FIG. 2 illustrates an improvement of audio quality, while using for example hands-free calls by a user in different noise types. Processed data of a hands-free call is shown in FIG. 2. In the example, in the beginning of the call, the user had a front side of the mobile device 100 towards his face. The user is in a noisy environment holding a mobile device 100 in his hand. Suddenly, the user turns the mobile device 100 upside-down in his hand at the point 210. In the FIG. 2, the original processing is shown by a curve 201 and improved processing is shown by a curve 202, respectively. The improved processing 202 takes advantage of the discussed examples. In the original processing 201, the uplink audio quality, after the mobile device 100 has been turned, is non-optimal. One can see that when the user is holding the mobile device 100 upside-down, speech is attenuated and a noise level is higher in the original processing 201 as compared to the improved processing 202. With the discussed examples, the device 100 can maintain as good uplink audio quality in the non-optimal upside-down position as in the optimal upright holding position throughout the call.

Figure 3:
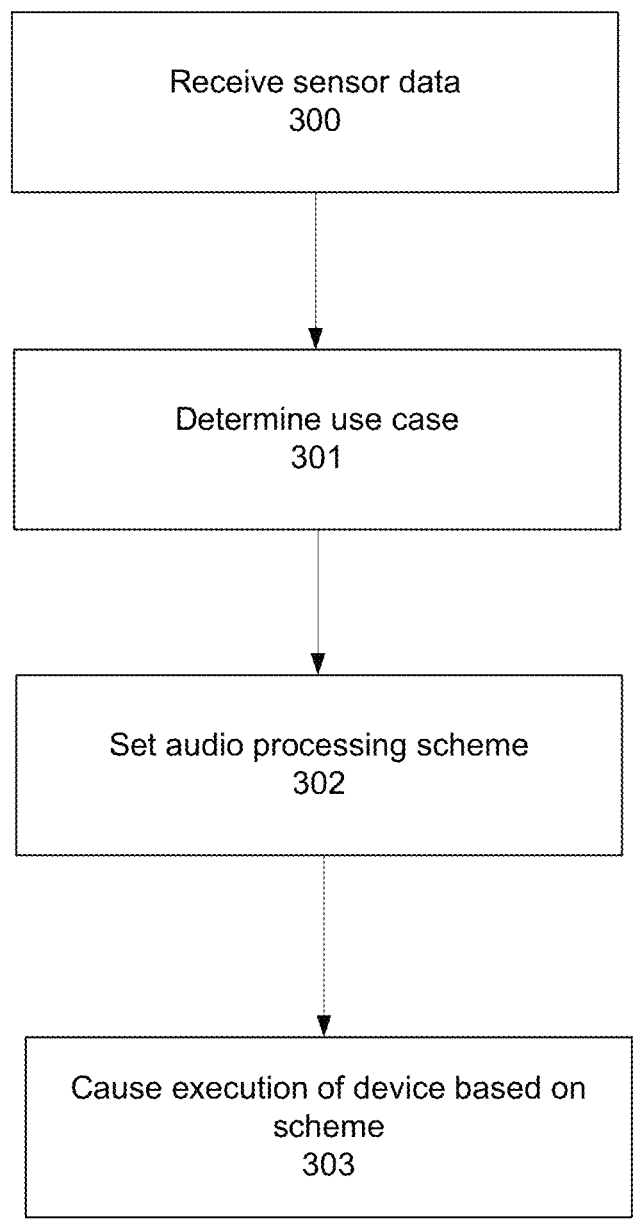
FIG. 3 illustrates a schematic flow diagram of a use case dependent audio processing method in accordance with an illustrative example.

FIG. 3 illustrates an example of a method for determining audio processing according to a use case. In the example of FIG. 3, an audio processor 102 of a mobile device 100 receives data from one or more acoustic sensors 101 and one or more other sensors 103 (step 300). The audio processor 102 determines a use case of the mobile device 100. The use case is determined based on the received data (step 301). To do so, the audio processor 102 first determines an activity class based on the received data. For example, the audio processor 102 can analyze the received data and determine the activity class based on the values of that data. Alternatively, the audio processor 102 can select the activity class from a predetermined list, where the list includes a class and its associated sensor data. The audio processor 102 can then match the received data to the listed sensor data and select the matching activity class. Alternatively, the audio processor 102 can receive the activity class from a specific application executing on the mobile device 100. Other ways of determining the activity class are also possible according to the requirements of the mobile device 100.

After determining the activity class, the audio processor 102 can then determine the use case based therefrom. For example, the audio processor 102 can match the determined activity class to its corresponding use case. Other ways of determining the use case are also possible according to the requirements of the mobile device 100. For example, in addition to the activity class the audio processor 102 may also determine an orientation of the device 100, and determine the use case based on the activity class and the orientation. For another example, the mobile device 100 may also determine a quality of the surface, on which the device 100 resting, and determine the use case based on the activity class and information about the surface quality. For another example, both information on the quality of the surface and the orientation may be used in determining the use case in addition to the activity class.

The audio processor 102 can set the audio processing scheme based on the determined use case (step 302) and cause the mobile device 100 to operate according to the audio processing settings (step 303).

Figure 4:
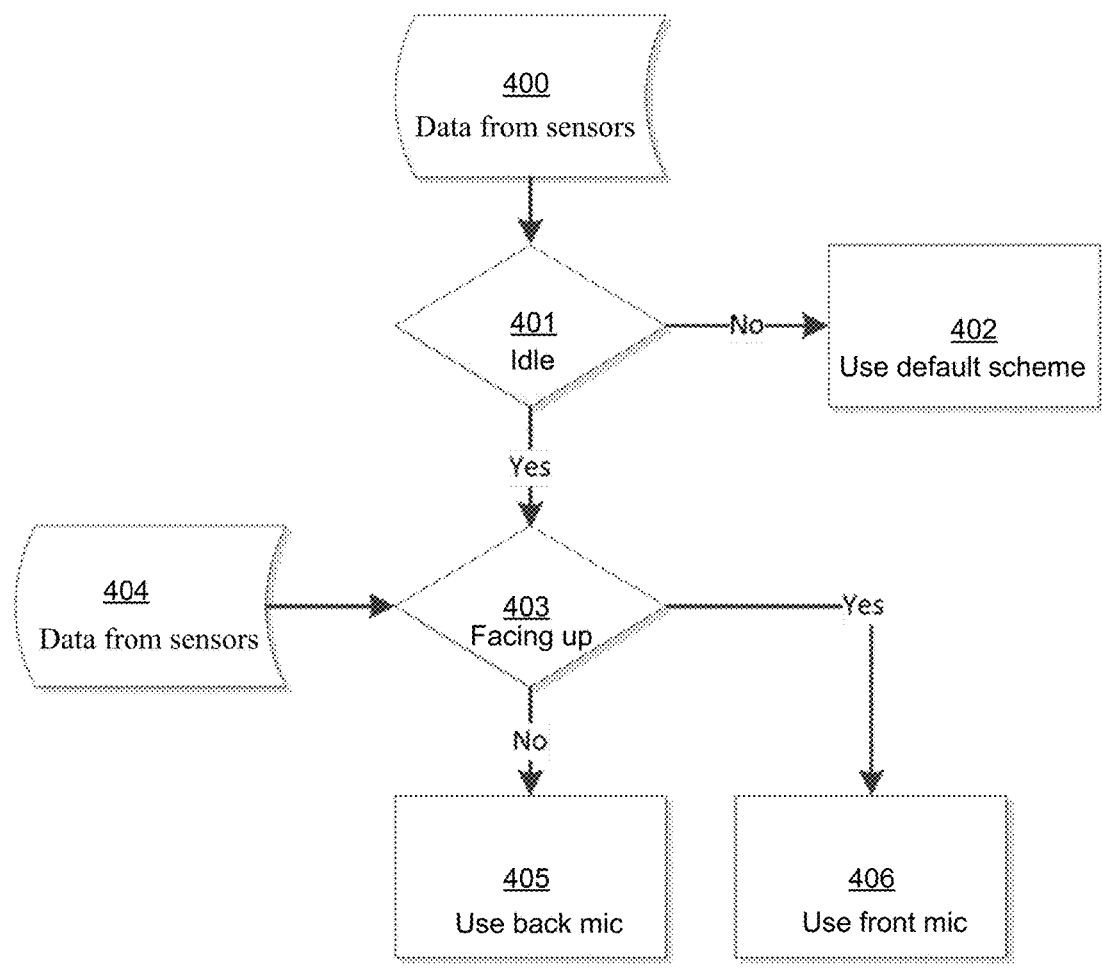
FIG. 4 illustrates a schematic flow diagram of a use case dependent audio processing method applied to a use case in accordance with an illustrative example.

FIG. 4 illustrates an example of the method as applied to a use case, wherein a mobile device 100 has two acoustic sensors 101, one at front and one at the back side of the device 100 and one or more other sensors 103, as illustrated in the example of FIG. 1. The mobile device 100 can choose how to use the acoustic sensors 101, and which one of the sensors to use, depending on the determined use case. In the step 400, the audio processor 102 receives data from the other sensor 103 and from either one acoustic sensor 101 or from both acoustic sensors 101. In the steps 401-406, the audio processor 102 analyzes the received data to determine the activity class and an orientation of the device 100, and thereby determines the use case. In step 401, the audio processor 102 determines, based on the sensor data, whether the mobile device 100 is idle. The determined idle mode may be an example of the activity class. In the step 402, a default audio processing scheme may be used, for example, if the audio processor 102 determines that the mobile device 100 is not in an idle mode. The example of FIG. 4 proceeds to the step 403, if the audio processor 102 determines that the mobile device 100 is in an idle mode. In the step 403 for the determined activity class, further an orientation is determined with the help of sensor data of the step 404. For example, if other sensor data suggests that the device 100 is placed on a surface facing up, the audio processor 102 sets the audio processing scheme such that the device 100 is configured to use the front audio sensor 101 in the step 406. If other sensor data suggests that the device 100 is placed on a surface facing down, the audio processor 102 sets the audio processing scheme such that the device 100 is configured to use the back audio sensor 101 in the step 405.

Figure 5:
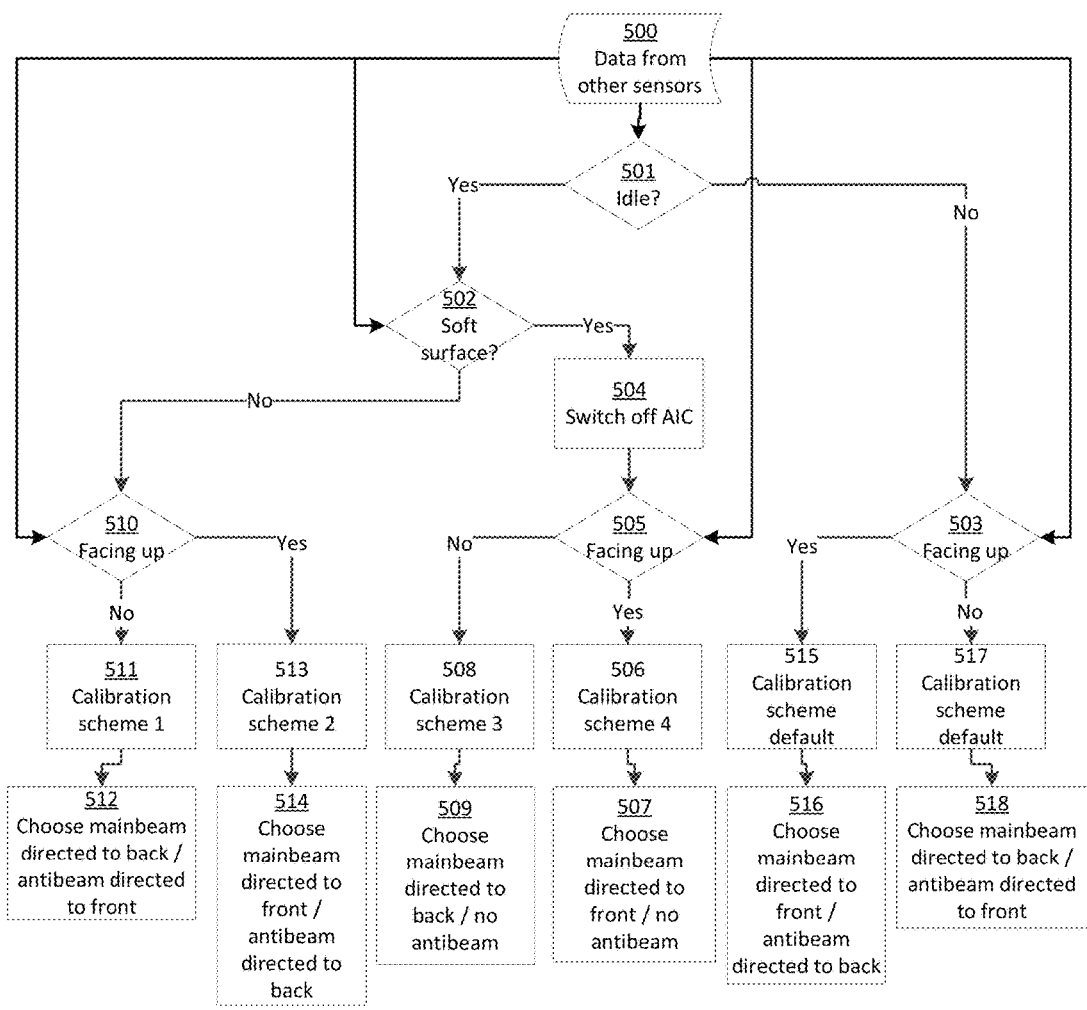
FIG. 5 illustrates a schematic flow diagram of a use case dependent audio processing method applied to a use case in accordance with another illustrative example.

FIG. 5 illustrates another example of the method as applied to a use case. In the step 500, the audio processor 102 receives data from other sensors 103. In the step 501, the audio processor 102 checks an activity class. For example, the audio processor 102 determines the activity class or gets this information as an input. Steps 502 and 503 illustrate examples of different types of results of the determined activity classes, for example an idle mode may or may not be determined. In the step 502, the acoustic sensor 101 is applied for determining the use case further. For example, the quality of the surface on which the mobile device 100 rests may be determined in the step 502. For example, the quality of the surface might be determined from the acoustic sensor or from the other sensor data, or a combination of these. As a result of the step 502, for example in the case of a soft surface, audio parameters are set in the step 504. For example, the adaptive interference canceller, AIC, may be switched off In the step 505, an orientation of the mobile device 100 is determined. For example, whether the device 100 is facing up or down. In the step 506, the audio processor 102 sets a calibration scheme based on the step 505, and previous steps 501 and 502. For example, the mobile device 100 is facing up. The mobile device 100 is configured to choose main beam directed to front and no anti-beam in the step 507. In the step 508, a calibration scheme is set based on the step 505, and previous steps 501 and 502. For example mobile device 100 is facing down. The mobile device 100 is configured to choose main beam directed to back and no anti-beam in the step 509.

As a result of the step 502, for example in the case of a hard surface on which the mobile device 100 rests, in the step 510, an orientation of the mobile device 100 is determined. For example, whether the mobile device 100 is facing up or down. In the step 511, the audio processor 102 sets a calibration scheme based on the step 510, and previous steps 501 and 502. For example, the mobile device 100 is facing down. The mobile device 100 is configured to choose a main beam directed to back and an anti-beam directed to front in the step 512. In the step 513, the audio processor 102 sets a calibration scheme based on the steps 510, and previous steps 501 and 502. For example, the mobile device 100 is facing up. The mobile device 100 is configured to choose a main beam directed to front and an anti-beam directed to back in the step 514.

In the step 503, based on the step 501 an orientation of the mobile device 100 is determined. Because in the step 501 a certain activity class has been detected, for example that the mobile device 100 is not in an idle mode, there is no need to perform the step 502, but the orientation is determined directly at the step 503. For example, in the step 503 the audio processor 102 determines whether the mobile device 100 is facing up or down. In the step 515, the audio processor 102 sets a calibration scheme based on the steps 503 and previous step 501. For example, the mobile device 100 is facing up. The mobile device 100 is configured to choose a main beam directed to front and an anti-beam directed to back in the step 516. In the step 517, the audio processor 102 sets a calibration scheme based on the steps 503 and previous step 501. For example, the mobile device 100 is facing down. The mobile device 100 is configured to choose a main beam directed to back and an anti-beam directed to front in the step 518.

In the example of FIG. 5, sensor data from the other sensor 103 is used to control audio processing in the steps 501, 502, 503, 505, and 510. Audio data from the acoustic sensor 101 may be used to further control the audio processing in the steps 501, 502, 503, 505, and 510. It should be also noted that the order of the steps may vary, for example the steps 505 and 510 (the facing up/down determination) might be executed before the step 502 (the soft surface determination).

Audio processing includes directivity processing. This includes, among other things, setting beamforming parameters, setting adaptive interference canceller, AIC, and setting a calibration scheme. There may be various possibilities to set up audio processing parameters of the mobile device 100.

An example of the audio processing relates to setting the beamforming parameters. In the directivity processing, two cardioid beams are generated by a filter-and-sum beamforming principle. The first one of these beams, the main beam, directs towards the user's mouth. The other beam, the anti-beam, directs in an opposite direction attenuating effectively the user's own speech. If there are only two acoustic sensors 101, such as microphones, in the mobile device 100 the beam directions are fixed. The beams will point to the direction, which is determined by the mic-to-mic axis. Consequently, the optimal noise reduction is achieved when the user is positioning the device 100 correctly, for example the main beam is directed towards the user's mouth. With three or more acoustic sensors 101, such as the microphones, the beams can be steered to a desired direction. Usually the steering directions are in a defined range of directions. The beams are defined as $$y(n, D) = \sum_{t=0}^{T} D^t \sum_{j=1}^{M} \sum_{k=0}^{L-1} a_t(j, k) x_j(n-k),$$

where M is the number of microphones and L is the filter length. The microphone signal is denoted by $x_j(n)$, and $a_t(j,k)$ represent the coefficients in a polynomial expansion of the filter coefficients $h_j(k)$ $$h_{j,k}(D) = a_0(j,k) + a_1(j,k)D + \ldots + a_T(j,k)D^T.$$

The direction is defined with the parameter D.

When the device 100 is placed on the table or some other surface, the anti-beam, which is directed away from the user, usually gets distorted, if some of the microphones are facing down against the surface. In this case the directivity processing will not be optimal and the noise reduction will suffer as compared to the optimal case. However, according to an example, the mobile device 100 can deduce the use case, for example that the mobile device 100 is placed on the table, from sensor data, and then use a special anti-beam configuration designed for the use case. This enables more optimal performance while the device 100 is placed on a surface.

It is possible to design multiple main beam/anti-beam configurations to achieve more optimal audio performance in all the different use cases. More specifically, in a beam design one determines the filter coefficients $a_t(j,k)$. According to an example, one could determine different filter coefficients for all the use cases and use the more optimal filter coefficients depending on the use case. For example, seven sets of filter coefficients corresponding to the seven examples of the use cases discussed above.

An example of the audio processing relates to setting AIC, adaptive interference canceller. When using beamforming in the directivity processing, the main beam is used as a speech reference and the anti beam as a noise reference to the AIC. It removes the correlating part of the ambient noise from the main beam output. Thus, if the anti beam is distorted, when the device 100 is on a surface, also AIC is affected. In some use cases, it might be useful to turn off AIC and use only beam processing. As an example it might be useful to switch off AIC on a very soft surface, when some of the microphone signals are heavily attenuated.

An example of the audio processing relates to a calibration scheme. The beamformer performance is very susceptible to a sensitivity difference in between the microphone signals. To ensure that the microphone sensitivities do not have a difference higher than about 0.5 dB, an automatic microphone sensitivity calibration algorithm is used to estimate and cancel the sensitivity difference.

When the mobile device 100 is placed on the table, some of the down-facing microphones might be affected. If the device 100 is on a hard surface, the sound in the down-facing microphones might get amplified. Also the echo from the speaker might get boosted by the surface in the down-facing microphones. On the other hand, when the device 100 is put on a soft surface, some of the microphones that are on the down-facing side can get blocked or heavily attenuated. In this case, depending on the placement of the microphones, the calibration scheme is affected.

The microphone calibration scheme may utilize sensor information for optimized behavior. Microphone calibration is divided into two parts, gain estimation and applying gain. Following discussion concentrates on estimation part, gain is applied to microphone signals if estimate is found to be mature enough.

If microphone signals contain proper data for calibration, sensitivity differences between the microphones are stored in the histogram. When histogram contains enough data and fulfills specified sharpness requirements calibration gain for the microphone pair in question can be calculated.

If device location/orientation information is available, the device 100 may determine microphone pairs for which calibration gain can be estimated in each use case. Depending on sensor information, microphone locations and mechanical design of the device 100, the device 100 may be configured to, for example to select the microphone pairs for which gain can be estimated for each use case or apply some gain compensation scheme. Also type of the surface has an effect on selecting the calibration scheme, since soft surface blocks down-facing microphones more easily than hard surface. The device 100 may, for example estimate the gain difference only for those microphone pairs, where neither of the microphones is blocked. If the device 100 is detected to be located on a table, different microphone pairs could be calibrated, depending on if the device 100 is in facing down or facing up position. Alternatively, some gain compensation scheme may be utilized for the selected microphone pair.

Figure 6:
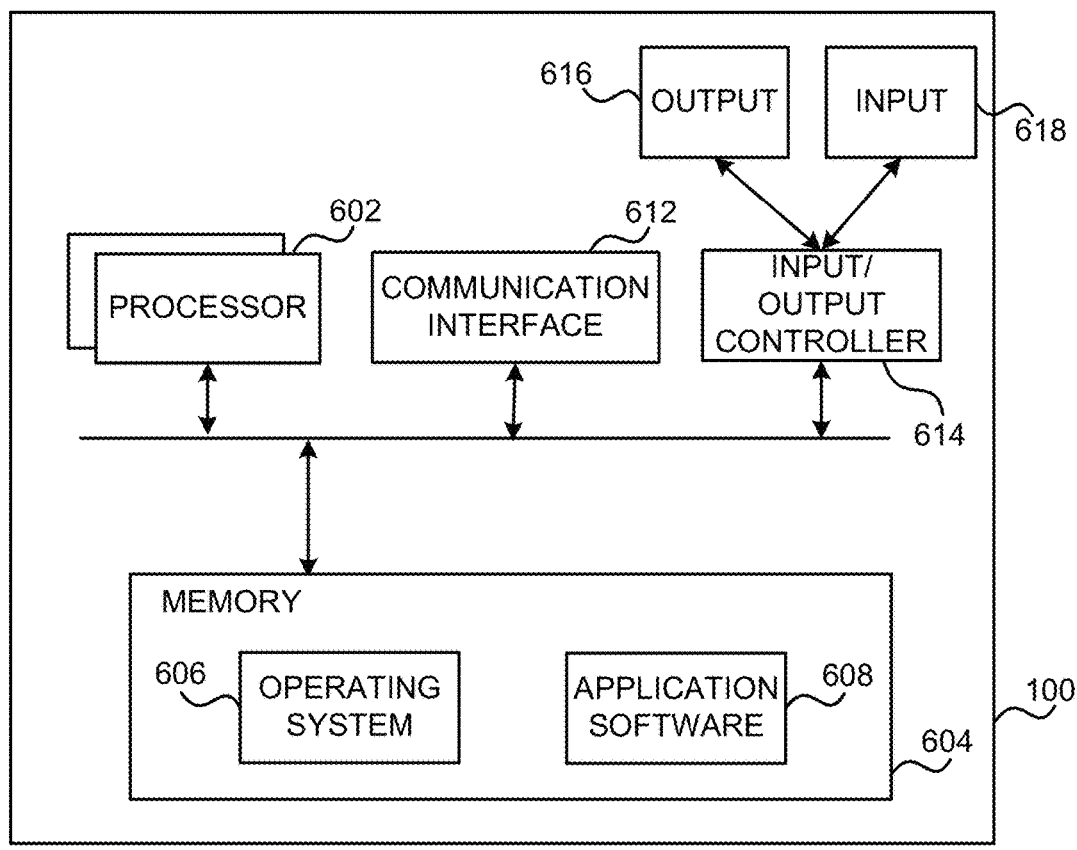
FIG. 6 illustrates a schematic representation of a mobile device in accordance with another illustrative example.

FIG. 6 illustrates an example of components of a mobile device 100 which may be implemented as any form of a computing and/or electronic device. The mobile device 100 comprises one or more processors 602 which may be microprocessors, controllers or any other suitable type of processors for processing computer executable instructions to control the operation of the apparatus 100. Platform software comprising an operating system 606 or any other suitable platform software may be provided at the apparatus to enable application software 608 to be executed on the device.

Computer executable instructions may be provided using any computer-readable media that is accessible by the device 100. Computer-readable media may include, for example, computer storage media such as memory 604 and communications media. Computer storage media, such as memory 604, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 604) is shown within the device 100, it will be appreciated that the storage may be distributed or located remotely and accessed via a network or other communication link (e.g. using communication interface 612).

In an example, the audio processor 102 may be established by the processor 602 and the memory 604 running the operating system 606 and the application software 608 configured to the audio processing. According to another example, the audio processor 102 may be a different entity from the processor 602, for example the processor 602 operates the main processing tasks of the device 100, and an audio processing card is used for the audio processor 102.

The device 100 may comprise an input/output controller 614 arranged to output information to a output device 616 which may be separate from or integral to the device 100. The input/output controller 614 may also arranged to receive and process input from one or more input devices 618, such as the acoustic sensor 101, the other sensors 103, and a user input device, for example a keyboard, camera, microphone and the other sensors). In one example, the output device 616 may also act as the user input device if it is a touch sensitive display device, and the input is the gesture input such as a touch. The input/output controller 614 may also output data to devices other than the output device, e.g. a locally connected printing device.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The term 'computer', 'computing-based device', 'apparatus' or 'mobile apparatus' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any example may be combined to another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not comprise an exclusive list and a method or apparatus may contain additional blocks or elements.

According to the above, some examples are directed to an apparatus, comprising: at least two acoustic sensors through which audio content is received; at least one other sensor; an audio processor connected to the sensors and configured to receive audio information from the acoustic sensors and other information, from the other sensor; wherein the audio processor is configured to determine a use case of the apparatus based on the audio information and the other information; wherein the audio processor is configured to adjust at least one audio processing scheme for the received audio content based on the determined use case. Additionally or alternatively to one or more of the examples, the audio processor is configured to determine the use case from a plurality of use cases of the apparatus. Additionally or alternatively to one or more of the examples, the audio processor is configured to determine the use case from a plurality of predetermined use cases of the apparatus. Additionally or alternatively to one or more of the examples, each use case has corresponding audio processing parameters, which are selected by adjusting the at least one audio processing scheme based on the determined use case. Additionally or alternatively to one or more of the examples, the at least one audio processing scheme is configured to select a set of audio parameters from a set of predetermined audio parameters by adjusting the at least one audio scheme. Additionally or alternatively to one or more of the examples, the use case is determined based on an activity class of the apparatus. Additionally or alternatively to one or more of the examples, the use case is further determined based on an orientation of the apparatus. Additionally or alternatively to one or more of the examples, the use case is further determined based on information about a surface against which the apparatus is positioned. Additionally or alternatively to one or more of the examples, the audio processor is configured to receive the use case or the activity class from an application, which is configured to determine the use case or the activity class. Additionally or alternatively to one or more of the examples, the activity class defines an approximation of a current activity or movement of the user of the apparatus. Additionally or alternatively to one or more of the examples, the activity class is based on the other information received from the other sensor. Additionally or alternatively to one or more of the examples, the audio processor is configured to determine the activity class among a plurality of predetermined activity classes. Additionally or alternatively to one or more of the examples, the activity class is configured to be automatically determined based on a closest approximate of an activity, which the user of the apparatus is doing. Additionally or alternatively to one or more of the examples, the audio processor is configured to determine the use case based on a quality of a surface on which the apparatus is located, and wherein the quality of the surface is determined from the audio information or from the other information. Additionally or alternatively to one or more of the examples, the audio sensor includes a microphone and the other sensor comprises at least one of: a magnetometer, a light sensor, a gyroscope, a hygrometer, a thermometer, a barometer, a proximeter, an accelerometer, or an ultrasonic transducer. Additionally or alternatively to one or more of the examples, the at least one audio processing scheme is configured to adjust at least one of: beamforming, an adaptive interference canceller, or a calibration scheme. Additionally or alternatively to one or more of the examples, the audio processor is configured to adjust the at least one audio algorithm for a main beam configuration or for an anti beam configuration of the acoustic sensors based on the determined use case. Additionally or alternatively to one or more of the examples, the audio processor is configured to adjust the at least one audio processing scheme so as to estimate a sensitivity difference between the acoustic sensors, and wherein the sensitivity difference is reduced.

Some examples are directed to a computer-readable storage medium comprising executable instructions for causing at least one processor of a computing apparatus to perform operations comprising: receive audio information from at least two acoustic sensors; receive other information from at least one other sensor; receive, by an audio processor connected to the sensors, the audio information and the other information; determine, by the audio processor, a use case of the apparatus based on the audio information and the other information; and adjust, by the audio processor, at least one audio processing scheme for the received audio information based on the determined use case.

Some examples are directed to a method, comprising: receiving audio content from at least two acoustic sensors; receiving other information from at least one other sensor; determining a use case of an apparatus based on the audio content and the other information; and adjusting at least one audio processing scheme for the received audio content based on the determined use case.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus, comprising:
   at least two acoustic sensors through which audio content is received for a device;
   at least one other sensor; and
   an audio processor connected configured to receive the audio information from the at least two acoustic sensors and other information from the at least one other sensor;
   wherein the audio processor is configured to:
      determine a quality of a surface against which the device is oriented from the audio information or the other information,
      determine a use case of the device from a plurality of use cases based on the determined quality of the surface against which the device is oriented,
      determine movement of the user based on the determined use case of the device determined from the quality of the surface on which the device is oriented, and
      adjust at least one audio processing scheme for the received audio content based on the determined movement of the user.

2. The apparatus of claim 1, wherein the device is oriented face down on the surface.

3. The apparatus of claim 1, wherein the use case comprises at least one of: walking, running, riding a bicycle, or being still.

4. The apparatus of claim 1, wherein the use cases have corresponding audio processing parameters, which are selected by adjusting the at least one audio processing scheme based on the determined use case.

5. The apparatus of claim 1, wherein the at least one audio scheme is configured to select a set of audio parameters from a set of predetermined audio parameters by adjusting the at least one audio processing scheme.

6. The apparatus of claim 3, wherein the determined movement of the user is further determined based, at least in part, on an activity class of the apparatus.

7. The apparatus of claim 2, wherein the determined movement of the user is further determined based on the orientation of the device being face down.

8. The apparatus of claim 3, wherein the audio processor is configured to receive the determined movement of the user from an application.

9. The apparatus of claim 6, wherein the activity class defines an approximation of a current movement of the device or the user of the apparatus.

10. The apparatus of claim 6, wherein the activity class is based on the other information received from the other sensor.

11. The apparatus of claim 6, wherein the audio processor is configured to determine the activity class among a plurality of predetermined activity classes.

12. The apparatus of claim 6, wherein the activity class is configured to be automatically determined based on a closest approximate of the determined activity, which the user of the apparatus is doing.

13. The apparatus of claim 1, wherein the other sensor comprises at least one of: a magnetometer, a light sensor, a gyroscope, a hygrometer, a thermometer, a barometer, a proximeter, an accelerometer, or an ultrasonic transducer.

14. The apparatus of claim 1, wherein the at least two acoustic sensors include at least one of a microphone.

15. The apparatus of claim 1, wherein the at least one audio processing scheme is configured to adjust at least one of: beamforming, an adaptive interference canceller, or a calibration scheme.

16. The apparatus of claim 1, wherein the audio processor is configured to adjust the at least one audio processing scheme for a main beam configuration or for an anti-beam configuration of the acoustic sensors based on the determined movement of the user.

17. The apparatus of claim 1, wherein the audio processor is configured to adjust the at least one audio processing scheme so as to adjust sensitivity difference estimation between acoustic sensors based on the determined movement of the user.

18. A computer-readable storage medium comprising executable instructions for causing at least one processor of a computing apparatus to perform operations comprising:
   receiving audio information from at least one acoustic sensor;
   receiving other information from at least one other sensor;
   receiving, by an audio processor, the audio information and the other information;
   determining a quality of a surface against which the device is oriented from the audio information or the other information;
   determining a use case of the device from a plurality of use cases based on the quality of the surface against which the device is oriented;
   determining movement of the user based on the determined use case of the device; and
   adjusting at least one audio processing scheme for the received audio content based on the determined movement of the user.

19. A method for adjusting audio of a computing apparatus, the method comprising:
   receiving audio information from at least one acoustic sensor;
   receiving other information from at least one other sensor;
   determining a quality of a surface against which the device is oriented from the audio information or the other information;
   determining a use case of the device from a plurality of use cases based on the quality of the surface against which the device is oriented;
   determining movement of the user based on the determined use case of the device; and
   adjusting at least one audio processing scheme for the received audio content based on the determined movement of the user.

20. The method of claim 19, further comprising determining from the audio information or the other information that the device is oriented face down on the surface.

* * * * *